United States Patent [19]

Prochaska et al.

[11] Patent Number: 4,951,460
[45] Date of Patent: Aug. 28, 1990

[54] APPARATUS AND METHOD FOR OPTIMIZING THE AIR INLET TEMPERATURE OF GAS TURBINES

[75] Inventors: James K. Prochaska, Houston; Mark H. Axford, Katy, both of Tex.

[73] Assignee: Stewart & Stevenson Services, Inc., Houston, Tex.

[21] Appl. No.: 295,869

[22] Filed: Jan. 11, 1989

[51] Int. Cl.$^5$ .............................................. F02C 7/08
[52] U.S. Cl. .............................. 60/39.161; 60/39.511
[58] Field of Search ............ 60/39.07, 39.182, 39.511, 60/39.52, 39.093, 39.161, 266, 267

[56] References Cited

U.S. PATENT DOCUMENTS

| | | | |
|---|---|---|---|
| 2,312,605 | 12/1939 | Traupel | 60/41 |
| 3,150,487 | 9/1964 | Mangan et al. | 60/39.182 |
| 3,422,800 | 1/1969 | La Haye | 60/39.07 |
| 3,703,807 | 11/1972 | Rice | 60/39.182 |
| 3,785,145 | 1/1974 | Amann | 60/39.52 |
| 4,418,527 | 12/1983 | Schlom et al. | 60/39.05 |

FOREIGN PATENT DOCUMENTS 3002615  6/1981  Fed. Rep. of Germany ... 60/39.182

OTHER PUBLICATIONS

Tatge et al., "Gas Turbine Air Inlet Treatment" General Electric Co.; 1980, pp. 21 & 24.
Donaldson Company, Inc. Brochure, 1976.
An Analysis of the Performance of a Gas Turbine Co-generation Plant by J. W. Baughn; ASME Transactions, vol. 105, 1983.

Primary Examiner—Louis J. Casaregola
Attorney, Agent, or Firm—A. Triantaphyllis

[57] ABSTRACT

A heat exchanger is disclosed for heating air entering a combustion gas turbine to increase the power output of the turbine when the turbine operates in a cold environment. The heat exchanger may be used also as a cooler to cool air entering the turbine to increase the power output of the turbine when the turbine operates in a hot environment.

15 Claims, 2 Drawing Sheets

APPARATUS AND METHOD FOR OPTIMIZING THE AIR INLET TEMPERATURE OF GAS TURBINES

TECHNICAL FIELD OF THE INVENTION

The present invention relates to the field of combustion gas turbines, and more particularly, to a method and an apparatus for optimizing the inlet temperature of the air flowing to a combustion gas turbine to improve the performance thereof. Still more particularly, the present invention discloses a method and an apparatus for raising the inlet temperature of the air when the ambient temperature is low to increase the power output of the combustion gas turbine in a cold environment. The apparatus may be used, not only as a heater to raise the inlet temperature of the air when the turbine is operated under cold conditions, but also, it may be used as a cooler to decrease the inlet temperature of the air to increase the power output of the turbine when the turbine is operated under hot conditions. Furthermore, the apparatus may be used in connection with a gas turbine as a heater only together with a separate cooler, the heater being placed into operation when the ambient temperature is low and the cooler being placed into operation when the ambient temperature is high.

BACKGROUND OF THE INVENTION

Combustion gas turbines are well known in the art. In general, those turbines include a compression section for compressing air entering the turbine, a combustion section following the compression section where the compressed air is combusted with fuel, and an expansion section, following the combustion section, where the combustion mixture from the combustion section is expanded to generate shaft work. The shaft work is transferred to an outside user that utilizes such shaft work. In many applications, the shaft work is transferred to an electrical generator that transforms the shaft work to electricity. The hot exhaust from the expansion section flows to a waste heat recovery unit where heat is recovered by generating steam or by providing heat to other media or heat utilizers.

Combustion gas turbines are constructed as single, double or triple shaft turbines Single shaft turbines include only one shaft utilized by both compression and expansion section at the same speed. A double shaft turbine includes two shafts, one shaft transferring work from the expansion section to the compression section and another shaft transferring work from the expansion section to a driven load. A triple shaft turbine includes one shaft transferring work from the expansion section to a portion of the compression section, a second shaft transferring work from the expansion section to another portion of the compression section, and a third shaft transferring work from the expansion section to the driven load. Although, single shaft turbines were used more often to generate work in the past, the use of double and triple shaft turbines has recently increased.

Several factors affect the performance and the work output generated by combustion gas turbines. One major factor is the inlet temperature of the air entering the compression stage of the turbine. Its effect on the power output of the gas turbine depends on the number of shafts of said turbine. In single shaft turbines, the output increases in a substantially linear fashion until it reaches a plateau as the inlet air temperature decreases. This correlation results from the fact that as the inlet temperature decreases, the density of the air increases whereby a larger mass of air flows through the turbine to generate an increased amount of work. FIG. 1 shows the above correlation of electricity generated versus inlet temperature of air for a single shaft combustion gas turbine operating with natural gas fuel at sea level, sixty (60) percent relative humidity, 60 hz, inlet loss of 4 inches of $H_2O$, exhaust loss of 10 inches of $H_2O$, and with no steam or water injection for control of nitrogen oxides emissions. The abscissa shows the inlet temperature of the combustion air in degrees Fahrenheit (°F.) and the ordinate shows the output at the generator terminals in kilowatts (kw).

In multi-shaft, i.e., double or triple shaft gas turbines, the correlation between output and inlet air temperature is different in that, although the output increases as the air inlet temperature decreases in a particular temperature range, the output reaches a maximum at the lowest point of that range and decreases as the temperature decreases below that point. Referring now to FIG. 2, there is shown a graph depicting the correlation between electrical output versus air inlet temperature of a double shaft General Electric LM2500 gas turbine generating electricity and operating with natural gas fuel at sea level, sixty (60) percent relative humidity, 60 hz, inlet loss of 4 inches of $H_2O$, exhaust loss of 10 inches of $H_2O$, and with water injection for control of nitrogen oxides emissions, the amount of the water being sufficient to meet the typical regulatory emission requirements of nitrogen oxides of about 42 parts per million on a dry basis. The abscissa shows the inlet temperature of the combustion air in degrees Fahrenheit (°F.), and the ordinate shows the output at the generator terminals in kilowatts (kw). FIG. 2 shows that the electrical output increases from about 18,500 kilowatts to about 24,300 kilowatts as the inlet temperature of the air decreases from 100° F. to 35° F. As the temperature decreases below 35° F., the electrical output decreases with such temperature decrease. Therefore, it appears from FIG. 2 that the most desirable air inlet temperature for that particular turbine is about 35° F.

Triple shaft gas turbines have a similar maximum electrical output achieved at a particular air inlet temperature. Referring now to FIG. 3, there is shown a graph depicting the correlation between electrical output and inlet temperature of air in a triple shaft General Electric LM5000 gas turbine generating electricity and operating with natural gas fuel at sea level, sixty (60) percent relative humidity, 60 hz, inlet loss of 4 inches of $H_2O$, exhaust loss of 10 inches of $H_2O$, with steam injection for control of oxides of nitrogen emissions (about 42 parts per million on a dry basis), and additional steam injection for power augmentation. The abscissa shows the inlet temperature of the combustion air in degrees Fahrenheit (°F.), and the ordinate shows the output at the generator terminals in kilowatts (kw). There is shown that the electrical output increases from about 39,500 kilowatts to about 53,000 kilowatts as the temperature decreases from 100° F. to 40° F. The electrical output starts decreasing beyond that point (40° F.) as the inlet temperature of the air decreases. Therefore, it is apparent that it is desirable to operate the gas turbine with an air inlet temperature of about 40° F.

In the past, because gas turbines have been more commonly used to generate power in hot climates, only coolers have been used to decrease the inlet temperature of the air to increase the power output. Heaters have not been used to increase the air inlet temperature towards the optimum air inlet temperature, as demonstrated by the above graphs, to increase the power output towards its maximum. As a result, the multishaft gas turbines previously used in cold environments did not produce the maximum output achievable by those turbines.

According to the present invention, a method and an apparatus are disclosed to increase the inlet temperature of the air in cold climates to obtain the optimum air inlet temperature by heating the air in a heater. The heater may be the same apparatus that is used to cool the air to reach the optimum air inlet temperature when the ambient temperature is high due to hot weather conditions. In those instances, the apparatus is sometimes referred to herein as the heater/cooler. The heater may also be a separate apparatus which is operated only during the cold periods while a separate cooling apparatus is used alone during the hot periods.

Another problem encountered in the past in cold climates has been the formation of ice at the inlet of the gas turbine caused by the condensation of water thereon. The accumulation of such ice is oftentimes very rapid and causes plugging of the filter surface, possible engine damage from ice formed at the engine bellmouth, and a total shutdown of the gas turbine. In the past, this problem has been addressed by flowing hot exhaust gases from the outlet of the turbine through a heat exchanger and over the inlet thereof to prevent such icing. One disadvantage of that method was that it required the addition of special equipment such as jackets around the inlet. Another disadvantage was that the hot gases were available at substantially high temperatures whereby they formed hot spots around the inlet of the turbine. Still another disadvantage was that the temperature at the inlet of the gas turbine could not be easily controlled. The addition of the heater disclosed by the present invention prevents the formation of ice at the inlet of the gas turbine while eliminating the problems of previous deicing techniques.

These and other advantages of the present invention will become apparent from the following description and drawings.

SUMMARY OF THE INVENTION

A method and an apparatus are disclosed for heating the air entering a multi-shaft gas turbine to increase the output of such turbine in cold climates. The heater may be the same apparatus used to cool the air to increase the output of the gas turbine when the turbine is operated in a hot ambient environment. Furthermore, the heater may be a separate apparatus which is used only for heating when the ambient temperature is low while a separate cooler is used to cool the air when the ambient temperature is high.

In cogeneration plants i.e., when a combustion gas turbine is used to generate electricity and steam, steam is used to supply heat to a heating medium that flows to the heater to heat the air entering the gas turbine. When the heater is the same apparatus used also as a cooler when the ambient temperature is high, the heater/cooler is connected to a cooling source that provides cooling to a cooling medium passing therethrough when cooling, rather than heating, is required. The cooling source also utilizes steam available in the cogeneration plant. Other heating and cooling sources may also be utilized depending on the energy availability in the particular operation.

BRIEF DESCRIPTION OF THE DRAWINGS

For a detailed description of the embodiments of the apparatus and the method of the present invention, reference will now be made to the accompanying drawings wherein.

DESCRIPTION OF THE PREFERRED EMBODIMENT

Figure 1:
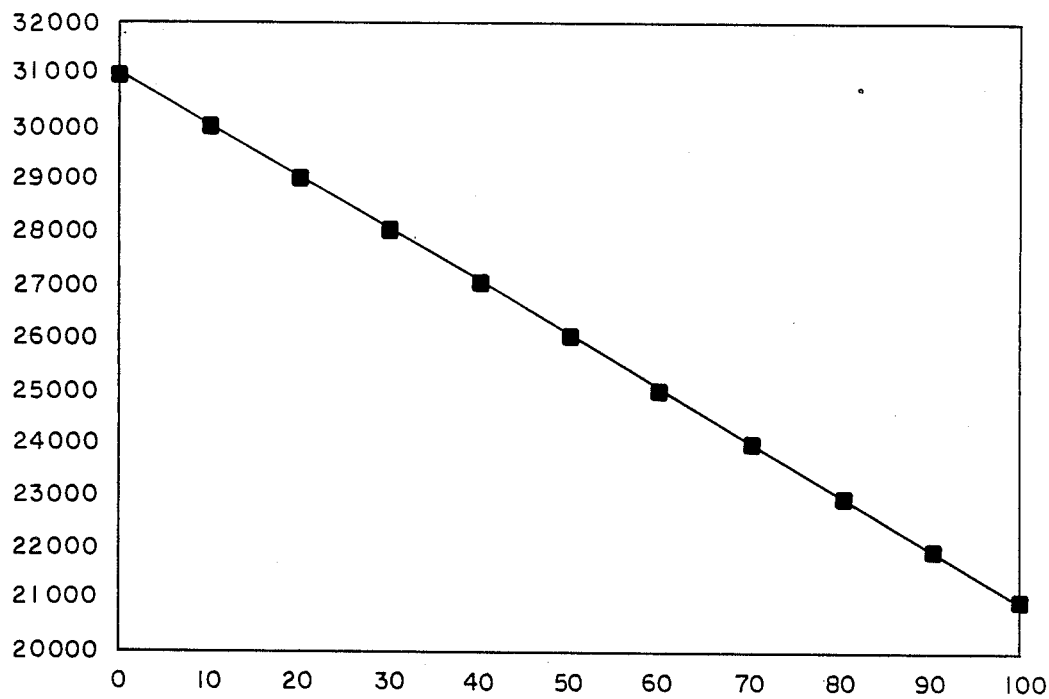
FIG. 1 is a graph showing the electrical output of a typical single shaft gas turbine generating electricity in kilowatts (kw) as a function of the inlet temperature of the combustion air flowing to such turbine in degrees Fahrenheit (°F.)
Figure 2:
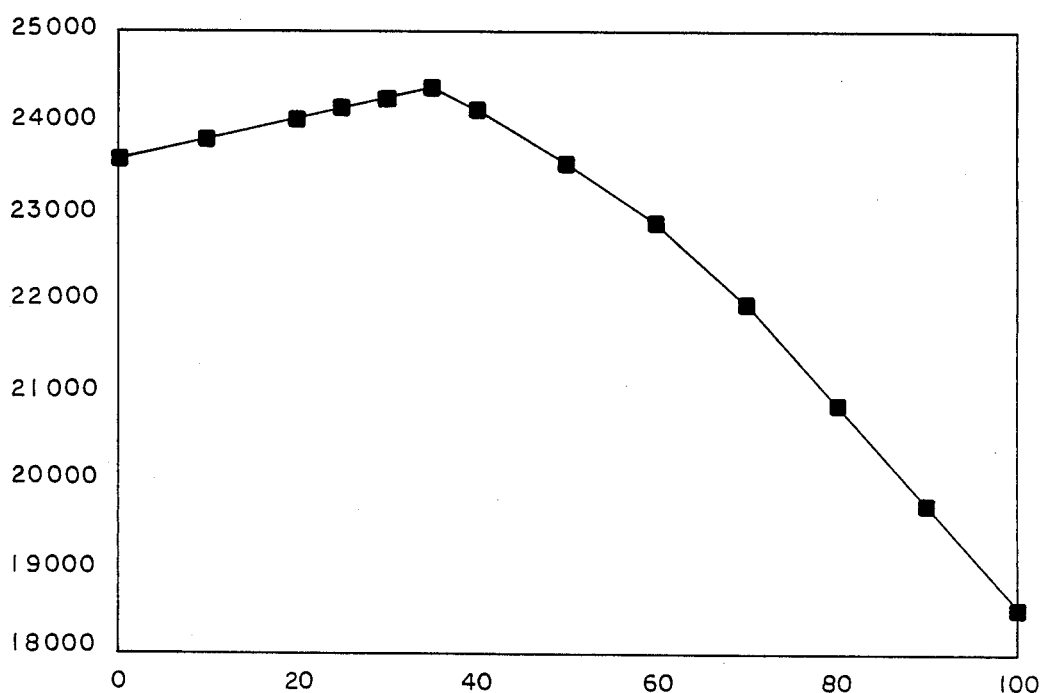
FIG. 2 is a graph showing the electrical output of a double shaft gas turbine (General Electric LM-2500) generating electricity in kilowatts (kw) as a function of the inlet temperature of the combustion air entering such turbine in degrees Fahrenheit (°F.)
Figure 3:
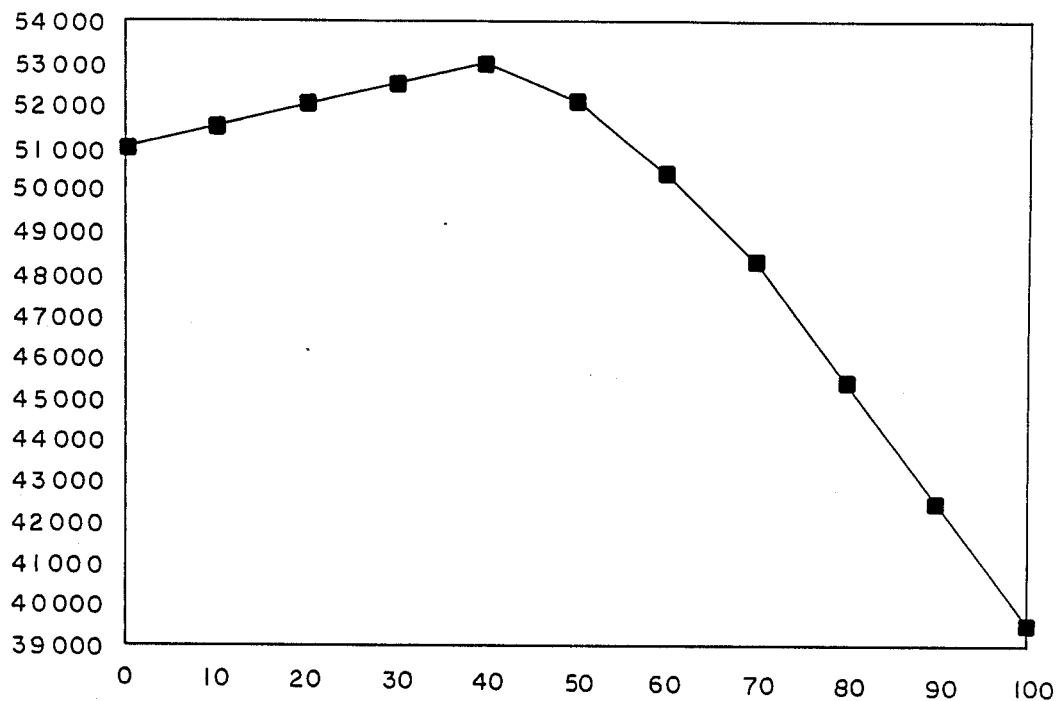
FIG. 3 is a graph showing the performance of a triple shaft gas turbine (General Electric LM-5000) generating electricity in kilowatts (kw) as a function of the inlet temperature of the combustion air entering such turbine in degrees Fahrenheit (°F.)

The power output of a combustion gas turbine is a function of the temperature of the air flowing into the turbine. In single shaft turbines, the power output of the turbine increases as the inlet air temperature decreases. In multishaft combustion gas turbines, the power output thereof increases as the air inlet temperature decreases but only over a certain temperature range. The power output reaches a maximum at the lowest point of that range and begins to decrease as the air inlet temperature decreases beyond that point. FIGS. 2 and 3 show that relationship. The lowest point of the range in which the power reaches a maximum is hereinafter sometimes referred to as the optimum inlet temperature. Accordingly, when a multishaft gas turbine operates in a hot environment wherein the ambient temperature is above the optimum inlet temperature, it is desirable to cool the air flowing to the turbine towards that optimum inlet temperature to increase its power output. Similarly, when a multishaft turbine operates in a cold environment where the ambient temperature is less than the optimum inlet temperature, it is desirable to increase the air inlet temperature up to such optimum inlet temperature to increase the power output thereof.

According to the present invention, when a multi-shaft combustion gas turbine is operated in an environment where the ambient temperature is less than the optimum inlet temperature for the turbine, the air is heated in a heat exchanger by exchanging heat with a heating medium such as a hot fluid or the like being heated by heat which is available from the gas turbine. Preferably, the heat exchanger may be utilized also as a cooler to cool the air entering the turbine when the ambient temperature is above the optimum inlet temperature to increase the performance of the turbine. Alternatively, the heat exchanger may be used alone as a heater for applications wherein the ambient temperature does not exceed the optimum inlet temperature or it may be used in combination with a separate heat exchanger which operates as a cooler for those instances wherein the ambient temperature exceeds the optimum inlet temperature.

Figure 4:
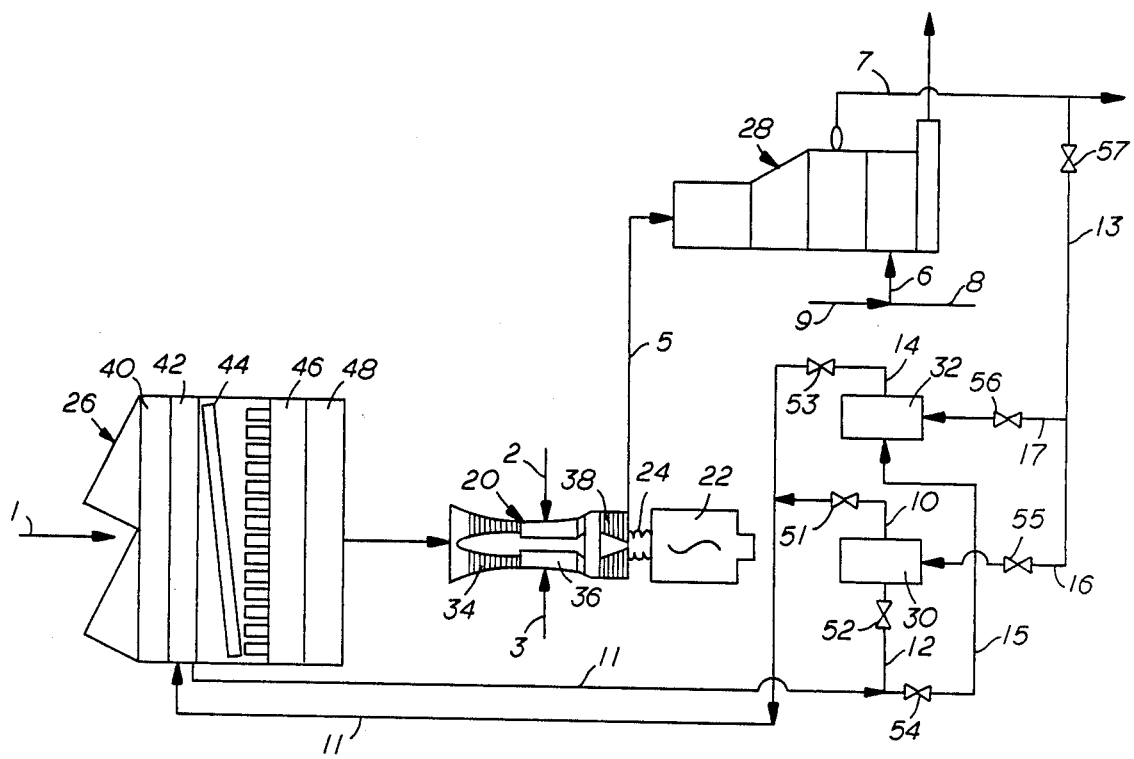
FIG. 4 is a flow sheet showing a cogeneration process generating electrical power and steam and the method and apparatus of the present invention wherein a heat exchanger is used to heat the air entering the gas turbine when the ambient temperature is low and to cool the air entering the gas turbine when the ambient temperature is high.

Referring now to FIG. 4, there is shown a cogeneration apparatus for generating electricity and steam having a heat exchanger for optimizing the temperature of the air entering a combustion gas turbine in accordance with the present invention. The heat exchanger is used as a heater to heat the air flowing to the combustion gas turbine when the ambient temperature is below the optimum inlet temperature and as a cooler to cool the air flowing to the combustion gas turbine when the turbine is operated in an environment where the ambient temperature is above the optimum inlet temperature. The cogeneration apparatus includes a gas turbine 20 being connected to an electrical generator 22 via shaft 24, an air filter/coil module 26 for treating the air inlet to turbine 20, a steam generator 28, a heating source 30 and a cooling source 32. Turbine 20 includes a compression section 34 a combustion section 36, and an expansion section 38. Air filter/coil module 26 includes a prefilter 40, a heat exchanger 42, a demister 44, final filters 46 and silencer 48. An air stream 1 enters air filter/coil module 26 and flows, in sequence, through prefilter 40, heat exchanger 42, demister 44, final filters 46 and silencer 48 for preparation prior to entering turbine 20. Prefilter 40 removes large particulates from air stream 1.

Heat exchanger 42 heats or cools air stream 1 in accordance with the present invention, depending on the temperature of the air entering air filter/coil module 26 and the optimum inlet temperature of gas turbine 20. More particularly, if the ambient air temperature is less than the optimum inlet temperature of turbine 20, heat exchanger 42 heats air stream 1 to raise its temperature up to the optimum inlet temperature by exchanging heat between air stream 1 and a hot heating medium provided in stream 11, as hereinafter described. Alternatively, if the ambient temperature of air stream 1 is greater than the optimum inlet temperature of gas turbine 20, heat exchanger 42 cools air stream 1 to reduce its temperature towards the optimum inlet temperature by providing cooling from a cold cooling medium provided through stream 11, as hereinafter described. In the event that the ambient temperature of air stream 1 is about equal to the optimum inlet temperature of turbine 20, no cooling or heating of air stream 1 is necessary in heat exchanger 42.

Demister 44 removes water that may be entrained in air stream 1, final filters 46 remove any fine particles that may be present in said air stream 1, and silencer 48 reduces the noise being generated by the flow of air stream 1.

Upon exiting air filter/coil module 26, air stream 1 enters compression section 36 where air stream 1 is compressed. The compressed air flows into combustion section 38 where it is combusted by combustion fuel gas flowing therein via combustion gas stream 2 in the presence of water flowing therein via water stream 3. Water is provided via water stream 3 to reduce the nitrogen oxiges emissions to the allowable level. The combustion gases being generated flow into expansion section 38 and generate shaft work which is transferred via shaft 24 to electrical generator 22 to generate electricity. Exhaust gas stream 5 containing hot gases flows from the outlet of turbine 20 to steam generator 28 where it heats and vaporizes boiler feed water entering steam generator 28 via line 6 to generate saturated high pressure steam exiting through steam stream 7 for appropriate utilization.

Condensate which is available from the utilization of steam stream 7 is returned to the steam generator via stream 8. Makeup water is provided by water stream 9.

Although heat exchanger 42 can be any heat exchanger that is suitable for heating or cooling an air stream, it is preferred that a coil heat exchanger having coils of finned tube type construction be used. Air flows through the exterior of the tubes and the heating or cooling medium flows through the tubes.

In the heating mode, i.e., when the ambient temperature is less than the optimum inlet temperature of turbine 20 and air stream 1 requires heating to increase the output of turbine 20, a hot heating medium comprised of water, glycol or other similar heat transfer media or mixtures thereof flows from heating source 30 to heat exchanger 42 via streams 10 and 11 to heat air stream 1. The cold heating medium exits heat exchanger 42 via stream 11 and returns to heating source 30 via stream 12 for further heating and recirculation to heat exchanger 42. A steam stream 13 supplies steam from steam stream 7 to heating source 30 via line 16 to heat the circulating heating medium.

In the cooling mode, i.e., when the ambient temperature is greater than the optimum inlet temperature and the performance of turbine 20 can be improved by cooling air stream 1 towards that temperature, a cold cooling medium such as water, glycol or other similar heat transfer media or mixtures thereof is circulated from cooling source 32 to heat exchanger 42 through streams 14 and 11 to cool air stream 1. Following the cooling of air stream 1, the hot cooling medium exits heat exchanger 42 via stream 11 and returns to chiller 32 via stream 15 for further cooling and recirculation to heat exchanger 42. Cooling source 32 is an absorption type chiller which utilizes steam from stream 7 flowing to chiller 32 via steam lines 13 and 17.

In the event that the ambient temperature is substantially equal to the optimum inlet temperature 20, no cooling or heating media are circulated in heat exchanger 42 via stream 11. The flow of heating or cooling medium in stream 11 is controlled in response to the temperature of air stream 1 entering turbine 20 and a predetermined optimum inlet temperature. Accordingly, well known flow control techniques and instruments may be used. Control valves 51, 52, 53, 54, 55, 56, and 57 control and regulate the flow in streams and lines 10, 12, 14, 15, 16, 17, and 13, respectively.

The following examples further illustrate the invention, but are not to be construed as limitations on the scope of the process and apparatus contemplated herein.

EXAMPLE 1

An LM2500 gas turbine manufactured by the General Electric Aircraft Engine Group of Evendale, Ohio, was placed in operation in accordance with the flow scheme shown in FIG. 4 in which the ambient temperature of air was 80° F. and its relative humidity was 80%. No heat exchange fluid was circulated in stream 11. The air flowed through air filter/coil module 26 with a total pressure drop of about 4 inches of $H_2O$ and entered compression section 36 of turbine 20 at 80° F. and 80% relative humidity. The air was compressed in compression section 36 and flowed to combustion section 38 where it was burned by 207.9 MMBTU per hour of lower heating value gas in the presence of 7205 pounds per hour of water. The exhaust gases were expanded in expansion section 38 and exited turbine 20 at 997° F. at a rate of 143.5 pounds per second. Shaft 24 transferred work to electrical generator 22 which generated 20,682 kilowatts of electricity. Exhaust stream 5 supplied heat in steam generator 28 and generated 91,800 pounds per hour of 150 psig saturated steam in steam line 7 by vaporizing return condensate returned by stream 8 at 200° F. and make up water provided by stream 9. Exhaust gas stream 5 exited steam generator 28 at 280° F. No steam was allowed to flow through steam stream 13 to either cooling source 32 or heating source 30.

EXAMPLE 2

The turbine of Example 1 was placed in operation in the same environment as Example 1 where the ambient temperature was 80° F. and the relative humidity was 80%. Air stream 1 was cooled in heat exchanger 42 by water circulating at 1200 gallons per minute being available at 45° F. Air stream 1 exiting air filter/coil module 26 was cooled to 61.9° F. and a relative humidity of 99%. The cooling water exiting heat exchanger 42 was at 55° F. and was returned to cooling source 32 for further cooling and/or circulation. The cooled air stream 1 was compressed in compression section 34 and combusted in combustion section 36 by 223.5 MBTU per hour of low heating value gas in the presence of 8,738 pounds per hour of water which was injected for control of nitrogen oxides emissions. The shaft work generated in expansion section 38 was transmitted to electrical generator 22 via shaft 24 and generated 22,637 kilowatts of electricity. Exhaust stream 5 exited turbine 20 at 981° F. at a rate of 152.2 pounds per second. Exhaust stream 5 generated 85,600 pounds per hour of 150 psig saturated steam in steam generator 28 by vaporizing condensate return provided at 200° F. by stream 8 and make-up water provided by stream 9. Exhaust stream 5 exited steam generator 28 at 285° F. The circulating water in stream 11 was cooled in cooling source 32 from 55° to 45° F. by an absorption process utilizing 9000 pounds per hour of steam available from steam stream 7 through steam lines 13 and 17. Example 2 shows that the cooling of the air inlet to turbine 20 from 80° F. to 61.9° F. increased the output of electric generator 22 from about 20,682 to about 22,637 kilowatts.

EXAMPLE 3

The turbine of Example 1 was placed in operation in an environment where the ambient temperature was 0° F. and the relative humidity was 60%. No heating or cooling was provided in heat exchanger 42. Air stream 1 entered turbine 20 at 0° F. and 60% relative humidity, was compressed in compression section 34 and was combusted in combustion section 36 by 228.1 MMBTU per hour of a low heating value gas in the presence of 9696 pounds per hour of $NO_x$ water. The exhaust stream was expanded in expansion section 38 and generated shaft work which was transmitted to electrical generator 22 by shaft 24 to generate 23,560 kilowatts of electricity. Exhaust stream 5 exited turbine 20 at 869° F. and at a rate of 165.5 pounds per second. Exhaust stream 5 generated 82,800 pounds per hour of 150 psig saturated steam in steam generator 28 by vaporizing condensate return available at 200° F. and make-up water. Exhaust gas stream 5 exited steam generator 28 at 306° F. No cooling or heating medium was circulated via stream 11 and no steam was utilized from steam line 7.

EXAMPLE 4

The gas turbine of Example 3 was placed in the same environment as in Example 3 at an ambient temperature of 0° F. and 60% relative humidity. Air stream 1 was heated in heat exchanger 42 to 35° F. and 18% relative humidity by hot water which circulated therethrough at the rate of 800 gallons per minute with an inlet temperature 100° F. and an outlet temperature of 75° F. via stream 11. The heated air stream 1 was compressed in compression section 34 and combusted in combustion section 36 by 238.9 MMBTU per hour of low heating value gas in the presence of 10,785 pounds per hour of water. The exhaust gases were expanded in expansion section 38. The shaft work that was transmitted to electric generator 22 via shaft 24 generated 24,378 kilowatts of electricity. Exhaust stream 5 exited turbine 20 at 964° F. at a rate of 160.2 pounds per second and generated 86,700 pounds per hour of 150 psig saturated steam in steam generator 28 by evaporating condensate return available at 200° F. and make-up water. Exhaust stream 5 exited steam generator 28 at 288° F. The circulating water was heated from 75° F. to 100° F. in heating source 30 by 9,900 pounds per hour of steam available from stream 7 and flowing to heating source 30 via streams 13 and 16. Examples 3 and 4 show that the preheating of air stream 1 from 0° to 35° F. increased the output of turbine from about 23,560 to about 24,378 kilowatts.

While a preferred embodiment of the present invention has been shown and described, various modifications of the apparatus and the process of the invention may be made by one skilled in the art without departing from the spirit of the invention and it is to be understood that the invention is limited only as defined in the following claims.

What is claimed is:

1. An apparatus, comprising:
   a multi-shaft combustion gas turbine having a first inlet for receiving air, a second inlet for receiving fuel, and an outlet for exhausting hot gases from the turbine; and
   a heat exchanger for flowing the air therethrough to heat the air before entering the first inlet to increase the power output of the turbine.

2. An apparatus according to claim 1 wherein the turbine is a double shaft turbine.

3. An apparatus according to claim 1 wherein the turbine is a triple shaft turbine.

4. An apparatus according to claim 1 further including:
   means for supplying heat to the heat exchanger;
   an electrical generator; and
   a shaft for transferring work from the turbine to the electrical generator to generate electricity.

5. An apparatus according to claim 1 further including:
   a steam generator;
   means for flowing water to the steam generator; and
   means for flowing the hot gases exiting the outlet of the turbine to the steam generator.

6. An apparatus according to claim 1 further including means for transferring heat from the exhaust gases exiting the outlet of the turbine to the heat exchanger.

7. An apparatus, comprising:

a multi-shaft combustion gas turbine having an inlet for receiving air, the power output of the turbine being affected by the temperature of the air entering the inlet so that it reaches its maximum at an optimum temperature of the air entering the inlet and decreases as the temperature of the air entering the inlet decreases below or increases above the optimum temperature; and means for heating the air entering the inlet to increase the temperature of the air towards the optimum temperature if the temperature of the air is less than the optimum temperature.

8. An apparatus according to claim 8 further including means for cooling the air entering the inlet to decrease the temperature of the air towards the optimum temperature if the temperature of the air is more than the optimum temperature.

9. An apparatus according to claim 7 further including means for providing a heating medium to the heating means.

10. An apparatus according to claim 8 further including means for providing a cooling medium to the cooling means.

11. An apparatus, comprising:

a multi-shaft combustion gas turbine having an air inlet for receiving air for use by the turbine, the temperature of the air affecting the power output of the turbine; and a heat exchanger for raising or lowering the temperature of the air flowing to the air inlet by exchanging heat between the air and a heating or a cooling medium to maximize the power output of the turbine.

12. An apparatus according to claim 11 further including means for providing cooling to the heat exchanger to cool the air.

13. An apparatus according to claim 11 further including means for providing heat to the heat exchanger to heat the air.

14. An apparatus, comprising:

a combustion gas turbine wherein the air inlet temperature of the air flowing into the turbine has an effect on the power output of the turbine, the effect being characterized by a maximum power output at an optimum air inlet temperature and a decrease as the air inlet temperature increases above or decreases below the optimum air inlet temperature; and a heat exchanger for flowing the air therethrough prior to flowing into the turbine to cool the air, if the temperature of the air is above the optimum air inlet temperature or the heat the air, if the temperature of the air is below the optimum air inlet temperature.

15. An apparatus according to claim 14 further including:

means for supplying cooling to the heat exchanger to remove heat from the air flowing therethrough, if the temperature of the air is above the optimum air inlet temperature; and means for providing heat to the heat exchanger to add heat to the air flowing therethrough, if the temperature of the air is below the optimum air inlet temperature.

* * * * *

UNITED STATES PATENT AND TRADEMARK OFFICE
CERTIFICATE OF CORRECTION

PATENT NO. : 4,951,460

DATED : August 28, 1990

INVENTOR(S) : James K. Prochaska, et al

It is certified that error appears in the above-identified patent and that said Letters Patent is hereby corrected as shown below:

Column 5, line 55, after "stream", insert -- 1--.

Column 9, claim 8, line 14, after "claim", delete "8" and insert -- 7 --.

Column 10, claim 14, line 21, after "or", delete "the" and insert -- to --.

Signed and Sealed this

Thirty-first Day of December, 1991

Attest:

HARRY F. MANBECK, JR.

*Attesting Officer*   *Commissioner of Patents and Trademarks*